United States Patent
Kallesøe et al.

(10) Patent No.: US 8,155,915 B2
(45) Date of Patent: Apr. 10, 2012

(54) METHOD FOR DETERMINING THE TEMPERATURE OF THE DELIVERY FLUID OF A CENTRIFUGAL PUMP

(75) Inventors: Carsten Skovmose Kallesøe, Viborg (DK); Henrik Kragh, Skørping (DK)

(73) Assignee: Grundfos Management a/s, Bjerringbro (DK)

( * ) Notice: Subject to any disclaimer, the term of this patent is extended or adjusted under 35 U.S.C. 154(b) by 685 days.

(21) Appl. No.: 12/142,848

(22) Filed: Jun. 20, 2008

(65) Prior Publication Data

US 2008/0319702 A1    Dec. 25, 2008

(30) Foreign Application Priority Data

Jun. 20, 2007 (EP) .................................. 07012018

(51) Int. Cl.
  *G01K 1/00* (2006.01)
  *F01B 25/00* (2006.01)
(52) U.S. Cl. ......................................... 702/130; 415/47
(58) Field of Classification Search .................. 702/130, 702/33, 44, 50, 57, 64–65, 75–76, 79, 81, 702/84, 127, 131, 136, 179, 182–183, 188–189, 702/198–199; 703/4, 7, 9, 18; 310/43, 61, 310/87, 152, 154.01, 156.01, 156.06, 179, 310/254, 258; 324/92, 98, 146, 151 A, 151 R; 374/163, 201, E7.039; 318/462, 471, 727; 415/20, 47, 94–95; 417/323, 334, 367, 375, 417/410.1, 423.1
See application file for complete search history.

(56) References Cited

U.S. PATENT DOCUMENTS

| | | | |
|---|---|---|---|
| 7,043,395 B2 * | 5/2006 | Vadstrup | 702/145 |
| 2006/0038539 A1 | 2/2006 | Swahn et al. | |
| 2006/0117875 A1 | 6/2006 | Schneider et al. | |
| 2007/0096571 A1 * | 5/2007 | Yuratich | 310/87 |

FOREIGN PATENT DOCUMENTS

| | | |
|---|---|---|
| CH | 399370 A | 9/1965 |
| EP | 1383231 A1 * | 1/2004 |
| EP | 1719916 A | 11/2006 |
| JP | 60241794 A | 11/1985 |
| WO | 03081764 A | 10/2003 |

OTHER PUBLICATIONS

Dickson et al., Microcomputer Control of Variable Frequency Drives Using the Submersible Motor as an Instrument, Jul./Aug. 1982, IEEE Transactions on Industry Aplications, vol. IA-18, No. 4, pp. 373-381.*

(Continued)

*Primary Examiner* — Mohamed Charioui
*Assistant Examiner* — Toan M Le
(74) *Attorney, Agent, or Firm* — Panitch Schwarze Belisario & Nadel LLP

(57) ABSTRACT

A method is provided for determining the temperature of the delivery fluid of a centrifugal pump driven by a permanent magnet motor, whose rotor runs within a fluid-filled can. The rotor temperature is evaluated by way of electrical variables of the motor, and the temperature of the delivery fluid is determined by way of the rotor. This method permits sensor-free temperature measurement of the delivery fluid with a circulation pump which is driven by a permanent magnet synchronous motor.

17 Claims, 3 Drawing Sheets

OTHER PUBLICATIONS

Kubota et al., Compensation for Core Loss of Adaptive Flux Observer-Based Field-Oriented Induction Motor Drives, 1992 IEEE, pp. 67-71.*

Ichikawa et al., Sensorless Control of Synchronous Reluctance Motors Based on Extended EMF Models Considering Magnetic Saturation With Online Parameter Identification, Sep./Oct. 2006, IEEE Transactions on Industry Applications, vol. 42, No. 5, pp. 1264-1274.*

Khatounian et al., Simultaneous Identification of the Initial Rotor Position and electrical parameters of a PMSM for a Haptic Interface, 2006 IEEE, EPE-PEMC, Portoroz, Slovenia, pp. 276-281.*

* cited by examiner

METHOD FOR DETERMINING THE TEMPERATURE OF THE DELIVERY FLUID OF A CENTRIFUGAL PUMP

BACKGROUND OF THE INVENTION

With centrifugal pumps, in particular with heating circulation pumps of a small and medium construction size, it is part of the state of the art to control the pump rotational speed in dependence on the temperature of the fluid delivered. This is particularly the case in modern heating installations, where the pump control is separate and independent of the remaining control, apart from the set-up and the switching on/off of the supply voltage. The pump control registers the heating requirement of the heating installation by determining the temperature of the delivery fluid, and controls the pump speed accordingly. This is done in a manner such that, with an increased heating requirement, thus when the delivery fluid in the feed has a high temperature, the rotational speed and thus the pump power are increased, and with a lower temperature the rotational speed and pump power are lowered and thus reduced. However, it may be useful, make sense or be necessary to determine the temperature of the delivery fluid for other reasons. This is effected in the prior art typically by a temperature sensor.

Such a temperature sensor involves an additional component, wherein furthermore, additional evaluation electronics are required, which likewise create further costs. Moreover, the arrangement of a temperatures sensor creates a potential weak location, since the sensor must be brought into contact with the delivery fluid in a heat-conducting manner.

BRIEF SUMMARY OF THE INVENTION

Against this background, it is an object of the present invention to provide a method for determining the temperature of the delivery fluid of centrifugal pumps, which can be done without the application of a temperature sensor, and which furthermore is inexpensive and may be carried out in a simple manner, i.e., with the hardware which is typically available with modern circulation pumps.

According to the invention, this object is achieved with a centrifugal pump driven by a permanent magnet motor, whose rotor runs within a fluid-filled can, in particular one through which delivery fluid flows, with which the rotor temperature is evaluated by way of electrical variables of the motor, and the temperature of the delivery fluid is determined by way of the rotor temperature.

The method according to the invention for determining the temperature of the delivery fluid of a centrifugal pump is usable with centrifugal pumps, known per se in the prior art, which comprise a permanent magnet motor, thus typically centrifugal pumps of a small or medium construction size. The method according to the invention is envisaged for motors, i.e., centrifugal pumps, with which the rotor of the motor runs within a can filled with the delivery fluid, in particular a can through which the delivery fluid flows. According to the invention, it is envisaged for the rotor temperature to be determined by way of the electrical variables of the motor, and to determine the temperature of the delivery medium by way of the rotor temperature.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangement and instrumentalities shown. In the drawings.

DETAILED DESCRIPTION OF THE INVENTION

Figure 1:
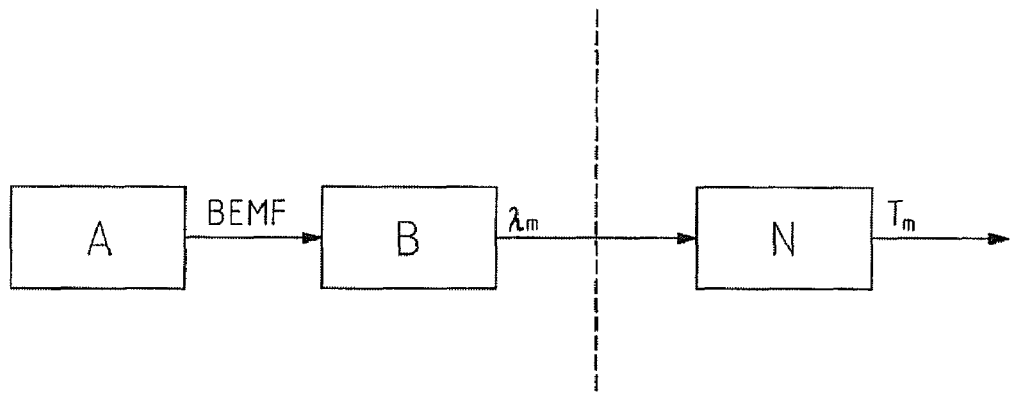
FIG. 1 is a block diagram schematically illustrating a method according to a first embodiment of the invention.

The basic concept of the method according to the invention and of a pump assembly, which has no temperature sensor and is operated with this method, is the determination of the delivery fluid temperature by way of the electrical variables of the motor, which as a rule are available anyway. The method according to the invention assumes that the rotor temperature is essentially dependent on the temperature of the delivery fluid. With modern permanent magnet motors of small and medium constructional size, the losses arising in the rotor are meanwhile so small, that the rotor itself practically no longer produces any waste heat. The temperature of the rotor therefore typically corresponds to that of the delivery fluid, or is at least dependent on this. The invention utilizes this effect by way of the temperature determination being effected without a sensor in a purely computed manner via the evaluation of the rotor temperature.

In order to be able to equate the temperature of the rotor, which is particularly advantageous, to that of the delivery fluid, it is necessary for an adequate heat exchange to be effected between the delivery fluid and the rotor. This is typically the case with canned pumps in which the delivery fluid flows through the can. However, in practice, it has been shown that a throughflow of the can is not absolutely necessary, but rather, a fluid-filled can, e.g. a canned pot, is sufficient, whose flange is in connection with the delivery fluid over a large-surface, and thus ensures an adequate thermal transfer between the delivery fluid and the rotor.

The evaluation of the temperature of the delivery fluid is advantageously effected by way of frequency converter electronics, which supply the motor, for control of the rotational speed. Such frequency converters typically have a digital control, in which the computation procedures being discussed may be implemented with regard to software. Furthermore, further synergies result from this, since all relevant electrical variables of the motor are present in any case in the frequency converter control, and may be determined in a simple manner, in order not only to drive this in an optimal manner with regard to energy, but also with regard to noise, as is known in the prior art.

Pump assemblies are known in the field of heating circulation pumps, which comprise a permanent magnet synchronous motor, which is supplied by an electronic frequency converter, with which the motor is run up and may be operated at different operating speeds. Thus the evaluation of the temperature of the delivery fluid may be effected with such motors alone by way of software implementation, without design changes or changes with regard to hardware becoming necessary.

The typical computational evaluation of the rotor temperature, via which the temperature of the delivery fluid is finally determined, may be effected according to the invention in different manners. It is particularly expedient to determine the rotor temperature via the magnetic flux of the rotor. As is known, the following are the mathematical relationships to one another:

$$\lambda_m = \lambda_m 0(1+\beta_m(T_m-T_{m0})), \quad \text{Equation (1)}$$

wherein
$\lambda_m$ is the magnetic flux of the rotor,
$\lambda_{m0}$ is the magnetic flux of the rotor at temperature $T_{m0}$,
$\beta_m$ is the temperature coefficient of the magnet(s) and
$T_m$ is the temperature of the rotor.

If one solves this equation (1) with respect to the rotor temperature, then from this results $$T_m = \frac{\lambda_m + (\alpha_m T_{m0} - 1)\lambda_{m0}}{\beta_m \lambda_{m0}}. \quad \text{Equation (1')}$$

According to this equation (1') therefore, the rotor temperature may be determined by computation with the knowledge of the rotor flux and the remaining material constant(s).

$$\frac{v_{BEMF}}{\omega_{re}} = \lambda_m, \quad \text{Equation (2)}$$

wherein
$v_{BEMF}$ is the voltage induced in the stator, and
$\omega_{re}$ is the electrical rotational speed of the rotor.

The evaluation of the magnetic flux of the rotor according to the invention may be effected in different manners. A first method according to the invention is represented in the block diagram according to FIG. 1. There, for determining the magnetic flux of the rotor, the motor is first set into operation and is briefly disconnected from the supply mains during operation, in order to then determine the voltage or currents induced in the stator, and furthermore to determine the magnetic flux of the rotor According to FIG. 1, in block A the running motor is first disconnected from the supply mains, in order after a certain time, when the currents flowing on account of external voltage have diminished, to determine, with the motor continuing to run, which currents are induced in the stator and which voltages then prevail at the stator. These are specified in FIG. 1 as an abbreviation at BEMF the "back electromotive force".

Since the motor must be disconnected from the electrical supply for the measurement, this disconnection must be effected as briefly as possible, in order to upset the normal operation of the motor as little as possible. Since according to the invention, the induced currents in the stator are determined advantageously at least with one period, thus within one electrical revolution of the motor, the motor must also be disconnected from the supply mains for at least that long.

Essentially, three problems result with the subsequent measurement, specifically on the one hand that the rotor speed need not be constant during the measurement, on the other hand that the harmonic oscillations are superimposed on the BEMF, and moreover that of the measurement accuracy. This is because the peak values of the BEMF have a smaller value of the voltage which occurs on operation. Furthermore, the differences of the BEMF at a temperature difference of the rotor of 100° are only about 20%. The measurement must therefore, on the one hand, encompass a large measurement range, since it must also stand up to the voltage peaks in normal operation, but on the other hand, must be highly accurate.

According to a further embodiment of the invention, this is effected by way of the measurement being carried out during a full period, thus over three zero-crossings. According to the invention, it has been found to be particularly advantageous to carry out several measurements within such a full period, preferably more than 10 measurements, in order then, from the magnitudes of the measurements, to form an average value and to base the voltage value on this average value with the further computation. However, a transformation must be previously carried out, which converts the three-phase system into a two-phase system, which is known per se in the prior art. Furthermore, one may determine an average speed of the rotor by way of this period, in order then to compute the magnetic flux of the rotor with these values. The statistical evaluation of the BEMF is represented in FIG. 1 in block B. The magnetic flux $\lambda_m$ of the rotor resulting therefrom, then according to block N, may be converted into the rotor temperature $T_m$ according to equation (1').

The previously described method according to the invention is comparatively simple with regard to evaluation technology, but has the disadvantage that the motor, even if only for a fraction of a second, must be disconnected from the supply mains, which is undesirable in some cases.

In order to avoid this, according to the invention in a further embodiment of the method, it is envisaged to determine the magnetic flux of the rotor during the operation of the motor. There, according to the invention, two solution ideas are envisaged, specifically on the one hand the evaluation of the magnetic flux by way of parameter identification, and on the other hand by way adaptive observer. Such parameter identification is known per se with permanent synchronous motors. In this context:

1. Flavia Khatounian, Sandrine Moreau, Eric Monmasson, Alexandre Janot, and Francois Louveau, "Simultaneous Identification of the Initial Rotor Position and Electrical Parameters of a PMSM for Haptic Interface," *EPE-PEMC*, Portoroz, Slovenia (2006); and
2. Shinji Ichikawa, Muntuwo Tomita, Shinji Doki, and Shigeru Okuma, "Sensorless Control of Permanent-Magnet Synchronous Motors Using Online Parameter Identification Based on System Identification Theory," *IEEE Transactions on Industrial Electronics*, Vol. 52, No. 2. (April 2006), in which this is described in detail, are referred to inasmuch as this is concerned.

With the parameter identification, typically a high-frequency signal is superimposed on the supply voltage, in order to then determine the parameters in a manner known per se. As soon as these parameters have been determined, the relation between these parameters and the rotor temperature or the stator temperature is known. Then, apart from the rotor temperature, one may additionally also determine the stator resistance according to the following:

$$R_s = R_{s0}(1+\alpha_w(T_s-T_{s0})) \quad \text{Equation (3)}$$

in which
$R_{s0}$ is the stator resistance at the temperature $T_{s0}$
$T_{s0}$ is the temperature of the stator when it has a resistance $R_{s0}$,
$T_s$ is the stator temperature, and
$\alpha_w$ is the temperature coefficient of the stator resistance.

From this results the $$T_s = \frac{R_s + (\alpha_w T_{s0} - 1)R_{s0}}{\alpha_w R_{s0}}, \quad \text{Equation (3')}$$

which specifies the stator temperature.

Figure 2:
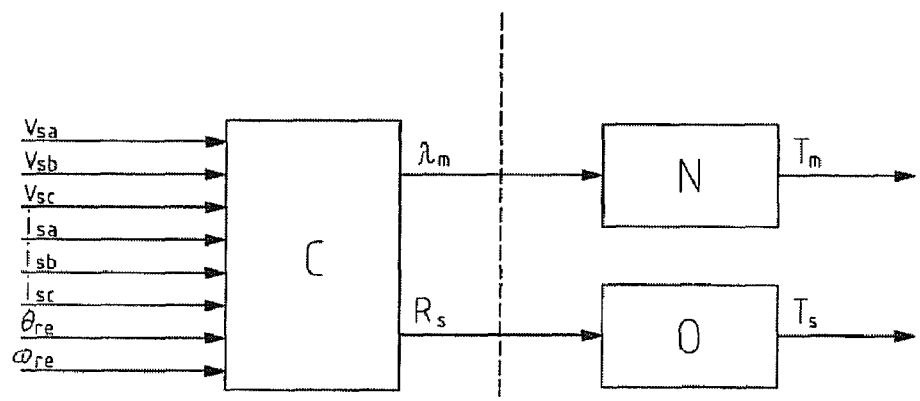
FIG. 2 is a block diagram schematically illustrating a method according to a second embodiment of the invention.

The previously described method is represented schematically by way of FIG. 2. According to block C, the stator voltages $V_{sa}$, $V_{sb}$ and $V_{sc}$, as well as the stator currents $i_{sa}$, $i_{sb}$ and $i_{sc}$, the electrical rotational speed $\omega_{re}$ and the electrical angle between the rotor and the stator $\theta_{re}$ are acquired as input variables, and the magnetic flux $\lambda_m$ and the stator resistance $R_s$ are determined by way of parameter evaluation. Then, as already with the method embodiment according to FIG. 1, in the block N the rotor temperature and thus also the temperature of the delivery fluid are determined from the magnetic flux of the rotor $\lambda_m$. Furthermore, the stator temperature is determined in block O, from the stator resistance according to the above equation (3').

With the method discussed further above in which the magnetic flux of the rotor is determined during operation by way of an adaptive observer, European patent application publication EP 1 383 231 A1 is particularly referred to, where such an observer is described. There, the currents and the voltages of the stator are modeled according to a mathematic motor model, and on the other hand are evaluated by measurement. The thus determined currents are compared to one another, and are determined by way of the comparison of the magnetic flux of the rotor. In EP 1 383 231 A1, the magnetic flux, the rotor position and the rotor speed are determined by way of the observer. Accordingly, with the method according to this embodiment of the invention, the magnetic flux of the rotor is determined by way of the observer, in order in this manner to determine the rotor temperature and thus the temperature of the delivery fluid.

Figure 3:
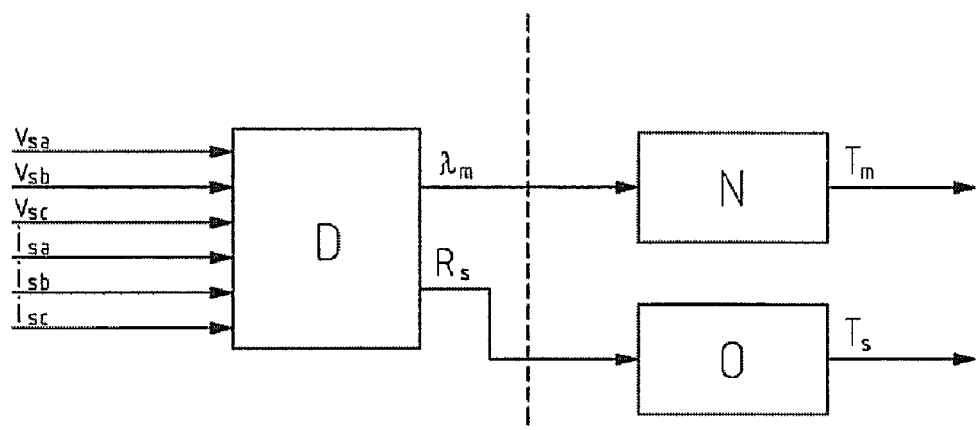
FIG. 3 is a block diagram schematically illustrating a method according to a third embodiment of the invention.

FIG. 3 shows how this is effected in practice. According to block D, the stator voltages $V_{sa}$, $V_{sb}$ and $V_{sc}$, as well as the stator currents $i_{sa}$, $i_{sb}$ and $i_{sc}$ are acquired, and the magnetic flux of the rotor $\lambda_m$ as well as the stator resistance $R_s$ are evaluated from these by way of the observer. Then, in the previously described manner, according to block N, the stator temperature $T_m$, as well as according to block O, the rotor temperature $T_s$ are evaluated in the previously described manner.

According to a further embodiment of the method according to the invention, however, the evaluation of the rotor temperature may not only be effected via the evaluation of the magnetic flux of the rotor, but also via the creation of a thermal balance and/or power balance of the motor. This is advantageously effected during operation of the motor, in that the electrical power taken up by the motor, the phase current, preferably its RMS-value, and the frequency of the voltage prevailing at the motor are determined. There, when, as is typical with such permanent magnet synchronous motors of small and medium power, they are supplied by a frequency converter, the electrical power which is taken up is determined by way of the intermediate circuit current and the intermediate circuit voltage of the frequency converter. These values are available in the frequency converter control in any case. The temperature of the rotor $T_m$ may thereby be determined by way of the following equations:

$$T_M = f_1(I_{rms}, T_m) \quad (4)$$
$$= 3\lambda_{m0}(1 + \beta_m(T_m - T_{m0}))I_{rms}$$

$$T_M = f_2(P_1, I_{rms}, f, T_s) \quad (5)$$
$$= \frac{P_1 - (3R_{s0}(1 + \alpha_s(T_s - T_{s0}))I_{rms}^2 + k_F f + k_{Iron} f I_{rms} + P_{I0})}{2\pi f}$$

$$T_s = f_3(I_{rms}, T_m) \quad (6)$$
$$= \frac{1}{B_m} 3R_{s0}(1 + \alpha_s(T_s - T_{s0}))I_{rms}^2 + T_m,$$

in which:
$T_M$ is the motor moment,
$\lambda_{m0}$ is the magnetic flux of the rotor at temperature $T_{m0}$,
$\beta_m$ is the temperature coefficient of the magnet(s),
$T_{m0}$ is the temperature at which the magnetic flux of the rotor is $\lambda_{m0}$,
$I_{rms}$ is the effective value of the phase current,
$P_1$ is the power taken up by the motor,
$R_{s0}$ is the stator resistance at temperature $T_{s0}$,
$\alpha_s$ is the temperature coefficient of the stator resistance,
$T_s$ is the stator temperature,
$T_{s0}$ is the stator temperature at which the resistance is $R_{s0}$,
$k_F$ is the intrinsic losses of the rotor,
f is the frequency of the current supply of the motor,
$k_{Iron}$ is the iron losses of the stator,
$P_{I0}$ is the losses of the frequency converter, and
$B_m$ is the thermal transfer resistance between the stator and the fluid.

Figure 4:
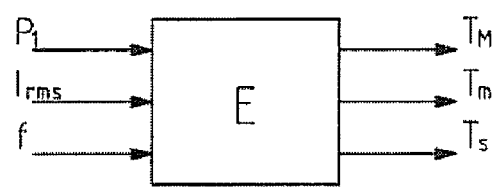
FIG. 4 is a block diagram schematically illustrating a method according to a fourth embodiment of the invention.

The equation (4) represents the motor moment as a function of the effective value of the stator current and the rotor temperature. The equation (5) represents the motor moment as a function of the power taken up, of the effective value of the phase current, of the frequency of the voltage prevailing at the motor, and of the stator temperature. Equation (6) represents the stator temperature as a function of the effective value of the stator current and of the rotor temperature. One may compute the rotor temperature, the stator temperature and the rotor moment from these three equations, as is represented in FIG. 4 by way of block E. Input variables there are the power taken up $P_1$, the effective value of the phase current $I_{rms}$ and the frequency f of the voltage prevailing at the motor. The specific equations may be modified accordingly, if the effective value of the phase current is replaced by another current variable which contains corresponding information.

The equations (4), (5) and (6) represent simplified equations, which among other things do not take into account the losses due to the surrounding temperature. However, it has been surprisingly found that it is particularly the case that these losses are negligible with heating circulation pumps of the construction type being discussed here, but nevertheless, as the case may be, may also be taken into account.

The previously described methods are particularly advantageously applicable with permanent magnet synchronous motors supplied by frequency converters, of a small and medium power, but their application is not restricted to this.

Figure 5:
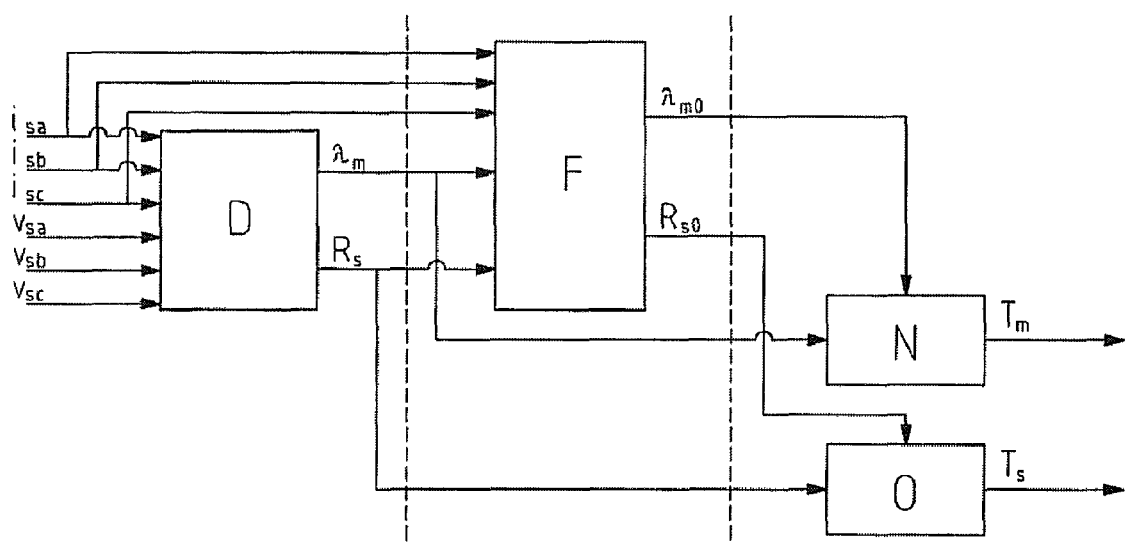
FIG. 5 is a block diagram schematically illustrating a variation of the method according to the embodiment of the invention illustrated in FIG. 3.

The magnets which are available on the market today, and which may be applied in the rotor of such a motor, are subject to comparatively large tolerances with regard to their magnetic properties. If such magnets are applied in permanent magnet synchronous motors, then according to a further embodiment of the invention, it is possible to take these tolerances into account on determining the temperature of the rotor, as this is represented by way of the block diagram according to FIG. 5.

The observer represented according to block D corresponds to that according to FIG. 3, but may also be effected by way of parameter identification, as described further above by way of FIG. 3, there, in particular block C. Thus according to block D and C respectively, the magnetic flux of the rotor $\lambda_m$ as well as the stator resistance $R_s$ are determined in the previously described manner. Then however, in contrast to the previously described methods, the material constants $\lambda_{m0}$, thus the magnetic flux of the rotor at temperature $T_{m0}$, as well as $R_{s0}$, the stator resistance at temperature $T_{s0}$ are determined. This is effected within block F according to FIG. 5, and specifically by way of a thermal model and parameter identification. The temporal course of the magnetic flux of the rotor, of the stator resistance and of the losses within the stator are thereby determined, in order to determine the material constants of the magnet(s) and/or of the stator, which are of relevance to the evaluation of the temperature, wherein the latter may also be acquired in tabular form, since these as a rule are not prone to large fluctuations.

The evaluation of these material constants may be effected by way of the following equations:

$$\frac{dR_s}{dt} = -a_1 R_s + a_2 \lambda_m + a_3 + a_4 P_{loss} \quad \text{Equation (7)}$$

$$P_{loss} = R_s i_{sa}^2 + R_s i_{sb}^2 + R_s i_{sc}^2 \quad \text{Equation (8)}$$

$$S = \frac{B_m}{a_1} \quad \text{Equation (9)}$$

$$R_{s0} = a_4 \frac{S}{\alpha_s} \quad \text{Equation (10)}$$

$$\lambda_{m0} = \frac{S}{\beta_m} \frac{a_1 a_4}{a_2} \quad \text{Equation (11)}$$

in which:

$v_{sa}$, $v_{sb}$, $v_{sc}$ are the present voltages of the three phases of the motor, $i_{sa}$, $i_{sb}$, $i_{sc}$ are the present currents of the three phases of the motor, $\lambda_m$ is the magnetic flux of the rotor, $R_s$ is the stator resistance, $\lambda_{m0}$ is the magnetic flux of the rotor at temperature $T_{m0}$, $R_{s0}$ is the stator resistance at the temperature $T_{s0}$, $T_m$ is the temperature of the rotor, $T_s$ is the stator temperature, $P_{loss}$ is the losses in the stator, $\alpha_1$, $\alpha_2$, $\alpha_3$, $\alpha_4$ are constants which describe the dynamic relationship between the stator resistance, magnetic flux of the rotor and the losses within the stator, S is the thermal capacity of the stator, $B_m$ is the thermal transfer resistance between the stator and the fluid, $\alpha_s$ is the temperature coefficient of the stator resistance, and $\beta_m$ is the temperature coefficient of the magnet(s).

The constants $\lambda_{m0}$ and $R_{s0}$ evaluated in this manner are then applied with the computation of the rotor temperature $T_m$ and the stator temperature $T_s$ according to the blocks N and O, as was also effected with the blocks N and O previously described by way of FIGS. 2 and 3.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for determining temperature of a delivery fluid of a centrifugal pump driven by a permanent magnet motor, whose rotor runs within a fluid-filled can, the method comprising:

receiving in a controller a plurality of electrical values from the permanent magnet motor;

determining in the controller a magnetic flux of the rotor based on the electrical values;

determining in the controller the temperature of the rotor based on the determined magnetic flux of the rotor, wherein the rotor temperature is determined during operation by way of electrical power taken up by the motor, a phase current, and by way of the frequency of the voltage prevailing at the motor, and wherein the rotor temperature Tm is determined by way of the following equations:

$$T_M = f_1(I_{rms}, T_m)$$
$$= 3\lambda_{m0}(1 + \beta_m(T_m - T_{m0}))I_{rms}$$

$$T_M = f_2(P_1, I_{rms}, f, T_s)$$
$$= \frac{P_1 - (3R_{s0}(1 + \alpha_s(T_s - T_{s0}))I_{rms}^2 + k_F f + k_{Iron} f I_{rms} + P_{I0})}{2\pi f}$$

$$T_s = f_3(I_{rms}, T_m)$$
$$= \frac{1}{B_m} 3R_{s0}(1 + \alpha_s(T_s - T_{s0}))I_{rms}^2 + T_m,$$

in which $T_M$ is a motor moment, $\lambda_{m0}$ is a magnetic flux of the rotor at temperature $T_{m0}$, $\beta_m$ is a temperature coefficient of the magnet(s), $T_{m0}$ is a temperature at which the magnetic flux of the rotor is $\lambda_{m0}$, $I_{rms}$ is an effective value of the phase current, $P_1$ is a power taken up by the motor, $R_{s0}$ is a stator resistance at temperature $T_{s0}$, $\alpha_s$ is a temperature coefficient of the stator resistance, $T_s$ is a stator temperature, $T_{s0}$ is a stator temperature, at which the resistance is $R_{s0}$, $k_F$ is intrinsic losses of the rotor, f is a frequency of current supply of the motor $k_{Iron}$ is iron losses of the stator, $P_{I0}$ is losses of the frequency converter, $B_m$ is thermal transfer resistance between the stator and fluid; and configuring the centrifugal pump such that the temperature of the delivery fluid is determinable from the temperature of the rotor.

2. The method according to claim 1, wherein the temperature of the rotor is equated with that of the delivery fluid.

3. The method according to claim 1, wherein the motor is activated by a frequency converter, and the temperature determination of the rotor is effected by way of electronics of the frequency converter.

4. The method according to claim 3, wherein the temperature evaluation of the rotor is effected by way of a digital frequency converter control.

5. The method according to claim 1, wherein the motor is disconnected from supply mains during operation, and a voltage induced in the stator is acquired for evaluating the magnetic flux of the rotor.

6. The method according to claim 5, wherein the voltage induced in the stator is determined at least within one full period (electrical revolution of the motor).

7. The method according to claim 6, wherein at least ten measurements of the electrical values are effected within a period, on which determination of the magnetic flux is based.

8. The method according to claim 1, wherein the determination of the magnetic flux of the rotor is effected during operation of the motor.

9. The method according to claim 1, wherein the magnetic flux of the rotor is determined by a parameter identification during the operation of the motor, and one determines on a basis of present voltage and current values.

10. The method according to claim 9, wherein stator resistance is additionally determined.

11. The method according to claim 1, wherein the magnetic flux of the rotor is determined by way of an observer during the operation of the motor, and on basis of present voltage and current values.

12. The method according to claim 11, wherein, by way of the observer, the motor currents are determined in a mathematical model on the one hand, and by way of measurement on the other hand, wherein the currents thus determined are compared to one another, and the magnetic flux of the rotor is determined by way of the comparison.

13. The method according to claim 1, wherein a thermal balance and/or a power balance of the motor is created during operation of the motor, and the rotor temperature is determined by way of the balance.

14. The method according to claim 1, wherein the phase current is a root-mean-square value (RMS-value) of the phase current.

15. The method according to claim 1, wherein the electrical power taken up is determined by way of an intermediate circuit current and an intermediate circuit voltage of a frequency converter which feeds the motor.

16. The method according to claim 1, wherein the can is one through which the delivery fluid flows.

17. A method for determining temperature of a delivery fluid of a centrifugal pump driven by a permanent magnet motor, whose rotor runs within a fluid-filled can, the method comprising:

receiving in a controller a plurality of electrical values from the permanent magnet motor;

determining in the controller a magnetic flux of the rotor based on the electrical values;

determining in the controller the temperature of the rotor based on the determined magnetic flux of the rotor, wherein material constants of the magnet(s) and/or of the stator, which are of relevance for the temperature determination, are determined by way of a temporal course of a magnetic flux of the rotor, of stator resistance and of losses within the stator, and wherein the determination of the material constants is effected by way of the following equations:

$$\frac{dR_s}{dt} = -a_1 R_s + a_2 \lambda_m + a_3 + a_4 P_{loss}$$

$$P_{loss} = R_s i_{sa}^2 + R_s i_{sb}^2 + R_s i_{sc}^2$$

$$S = \frac{B_m}{a_1}$$

$$R_{s0} = a_4 \frac{S}{\alpha_s}$$

$$\lambda_{m0} = \frac{S}{\beta_m} \frac{a_1 a_4}{a_2}$$

in which $i_{sa}$, $i_{sb}$, $i_{sc}$ are present currents of three phases of the motor,
$\lambda_m$ is a magnetic flux of the rotor,
$R_s$ is a stator resistance,
$\lambda_{m0}$ is the magnetic flux of the rotor at temperature $T_{m0}$,
$R_{s0}$ is the stator resistance at temperature $T_{s0}$,
$T_m$ is the temperature of the rotor,
$T_s$ the stator temperature,
$P_{loss}$ is losses in the stator,
$a_1$, $a_2$, $a_3$, $a_4$ are constants which describe a dynamic relationship between the stator resistance, the magnetic flux of the rotor and the losses within the stator,
S is a thermal capacity of the sensor,
$B_m$ is a thermal transfer resistance between the stator and the fluid,
$\alpha_s$ is a temperature coefficient of the stator resistance, and
$\beta_m$ is a temperature coefficient of the magnet(s).

* * * * *